United States Patent
Ho et al.

(10) Patent No.: US 7,742,316 B2
(45) Date of Patent: Jun. 22, 2010

(54) PROTECTION ASSEMBLY FOR A MULTI-SURFACE HOUSING

(75) Inventors: HeeChing Ho, Singapore (SG); Suwandi Chendekiawan, Singapore (SG); JuiJing Lim, Singapore (SG); BoonSeng Ong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 727 days.

(21) Appl. No.: 11/649,985

(22) Filed: Jan. 5, 2007

(65) Prior Publication Data

US 2008/0165489 A1 Jul. 10, 2008

(51) Int. Cl.
*H05K 9/00* (2006.01)

(52) U.S. Cl. ...................... 361/818; 361/816
(58) Field of Classification Search .......... 361/800, 361/816, 818, 715; 174/35 R, 51
See application file for complete search history.

(56) References Cited

U.S. PATENT DOCUMENTS

| | | | |
|---|---|---|---|
| 5,666,239 A * | 9/1997 | Pottebaum | 360/97.03 |
| 5,757,580 A | 5/1998 | Andress et al. | |
| 5,761,031 A | 6/1998 | Ajmani | |
| 6,034,841 A * | 3/2000 | Albrecht et al. | 360/97.01 |
| 6,078,498 A * | 6/2000 | Eckerd et al. | 361/679.31 |
| 6,233,140 B1 | 5/2001 | Cummings et al. | |
| 6,359,836 B1 | 3/2002 | Servier et al. | |
| 6,411,463 B1 | 6/2002 | Janik et al. | |
| 6,469,864 B2 * | 10/2002 | Kamezawa et al. | 360/97.01 |
| 6,522,498 B1 | 2/2003 | Lim et al. | |
| 6,867,942 B2 | 3/2005 | Albrecht et al. | |
| 6,917,520 B2 | 7/2005 | Lin et al. | |
| 6,958,884 B1 * | 10/2005 | Ojeda et al. | 360/97.02 |
| 6,985,366 B2 | 1/2006 | Albayrak et al. | |
| 7,577,001 B2 * | 8/2009 | Park et al. | 361/807 |
| 2005/0088777 A1 | 4/2005 | Chee et al. | |
| 2007/0257410 A1 * | 11/2007 | Toh et al. | 267/153 |

* cited by examiner

*Primary Examiner*—Hung S Bui
(74) *Attorney, Agent, or Firm*—Fellers, Snider, et al.

(57) ABSTRACT

Apparatus for protecting a multi-surface housing from mechanical vibration (shock) and electromagnetic interference (EMI). A protection assembly incorporates an EMI shield member with a base portion configured to extend adjacent a first surface of the housing. A tab portion extends from an edge of the base portion adjacent a second surface of the housing. An elastomeric member extends adjacent the second surface and encapsulates the tab portion. The protection assembly preferably forms a tub-shaped recess to receivingly nest the housing. A host device interconnect feature preferably extends from the base portion to facilitate an electrical interconnection of the shield member with a host device. The protection assembly is preferably formed by molding the elastomeric member onto the shield member using an injection molding process. The housing is preferably characterized as a data storage device housing which encloses at least one data storage medium.

18 Claims, 3 Drawing Sheets

PROTECTION ASSEMBLY FOR A MULTI-SURFACE HOUSING

FIELD OF THE INVENTION

The claimed invention relates generally to the field of protection devices and more particularly, but not by way of limitation, to a protection assembly for use with a multi-surface housing, such as a housing of a data storage device, to protect against mechanical vibration (shock) and electromagnetic interference (EMI).

BACKGROUND

The ongoing commercialization of digital data processing devices has generally resulted in successive generations of devices having ever higher rates of functionality and inter-connectivity. To this end, data storage capabilities are being increasingly incorporated into a number of different types of devices, particularly with hand-held portable devices such as cell phones, digital cameras, personal data assistants (PDAs), etc.

A disc drive is an exemplary type of data storage device that generally stores data on one or more rotatable magnetic recording media. A corresponding array of data transducers (heads) is selectively moved across the surfaces of the media to transduce data therewith. Other exemplary types of data storage devices use solid state memory media such as FLASH memory, optical media, etc.

It is often generally desirable to protect a housing of any data storage device from environmental factors that can have a detrimental impact upon device performance. Such factors can include mechanical vibration (shock) and electromagnetic interference (EMI). Such protection is particularly desirable when the housing can be subjected to a number of robust operational environments.

SUMMARY OF THE INVENTION

To this end, preferred embodiments of the present invention are generally directed to a protection assembly for a multi-surface housing, such as a housing of a data storage device.

In accordance with preferred embodiments, the protection assembly comprises an electromagnetic interference (EMI) shield member. The shield member comprises a base portion configured to extend adjacent a first surface of a multi-surface housing, and a tab portion configured to extend from an edge of the base portion adjacent a second surface of the housing non-parallel to the first surface. An elastomeric member extends adjacent the second surface and encapsulates the tab portion.

These and various other features and advantages that generally characterize preferred embodiments of the present invention will be apparent upon reading the following detailed description and upon review of the associated drawings.

DETAILED DESCRIPTION

Figure 1:
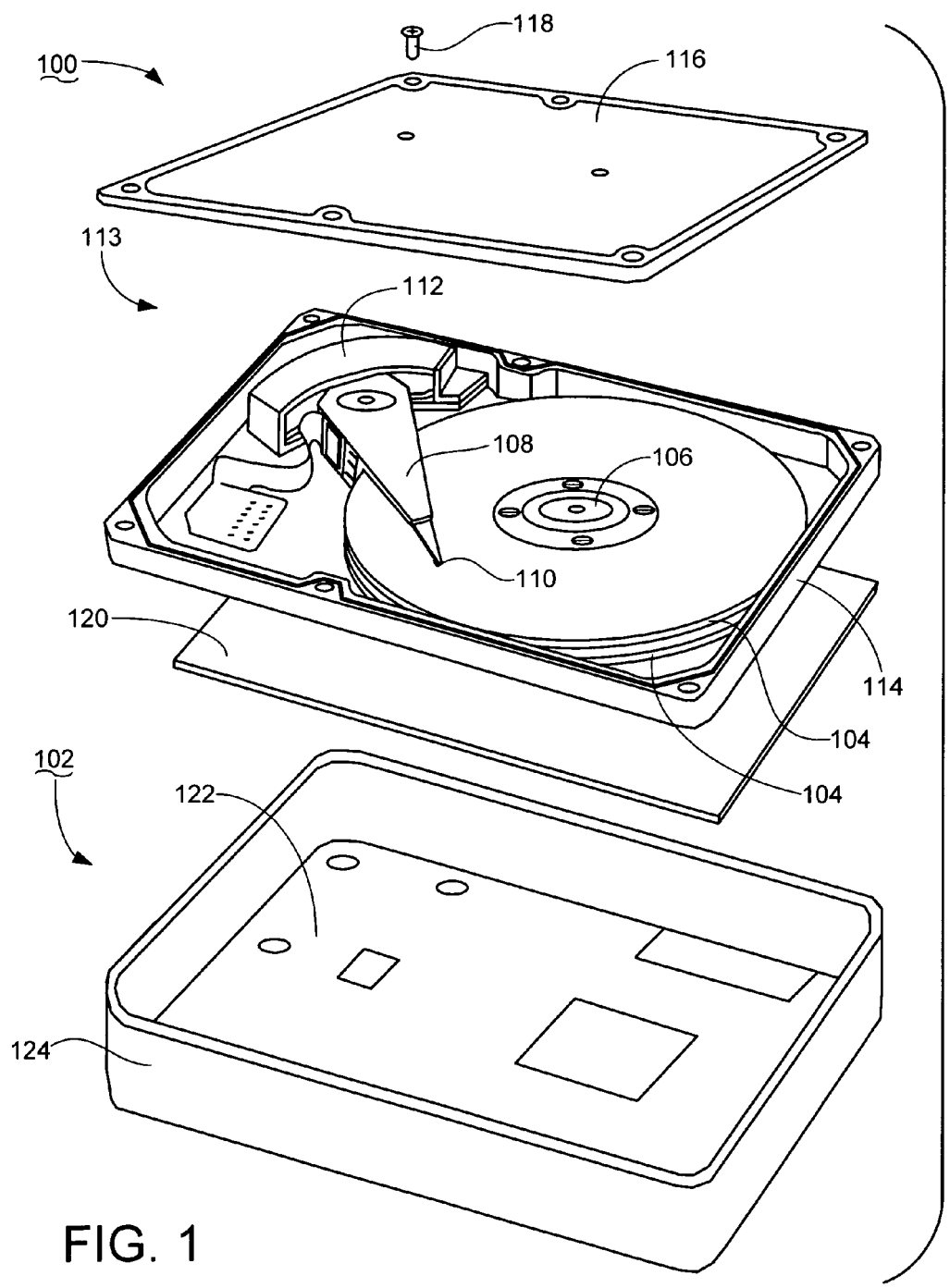
FIG. 1 is an exploded isometric view of an exemplary data storage device in conjunction with a protection assembly constructed in accordance with embodiments of the present invention.

FIG. 1 provides an exploded view of an exemplary data storage device 100 in conjunction with an accompanying protection assembly 102. The data storage device 100 is shown to be preferably characterized as a disc drive, although other types of data storage devices can alternatively be readily utilized as desired.

The storage device 100 includes a number of rotatable media (discs) 104 which are rotated by a spindle motor 106 at a selected rotational speed during device operation. A single disc, or other forms of storage media such as solid-state memory, can be employed as desired. An actuator 108 includes a corresponding array of transducers (heads) 110 that transducer data to and from tracks (not shown) defined on the media surfaces. The actuator is rotated by operation of a voice coil motor (VCM) 112, which results in movement of the transducers 110 across the media surfaces.

These various components are enclosed within a multi-surface housing 113 preferably formed by a base deck 114 and a top cover 116. The top cover 116 is affixed to the base deck 114 using a plurality of threaded fasteners (one shown at 118).

Communication and control electronics for the storage device 100 are preferably disposed on a printed circuit board (PCB) 120. The PCB 120 is preferably mounted to an exterior surface of the base deck 114 using a plurality of threaded fasteners (not shown). However, alternative locations for the PCB 120 can readily be used, including the placement of the PCB 120 within the housing 113 as desired.

The protection assembly 102 is configured to protect the assembled data storage device 100 from the effects of mechanical vibration (shock) and electromagnetic interference (EMI). To this end, the protection assembly 102 preferably forms a tub-shaped recess as shown to receivingly nest the storage device 100.

Figure 2:
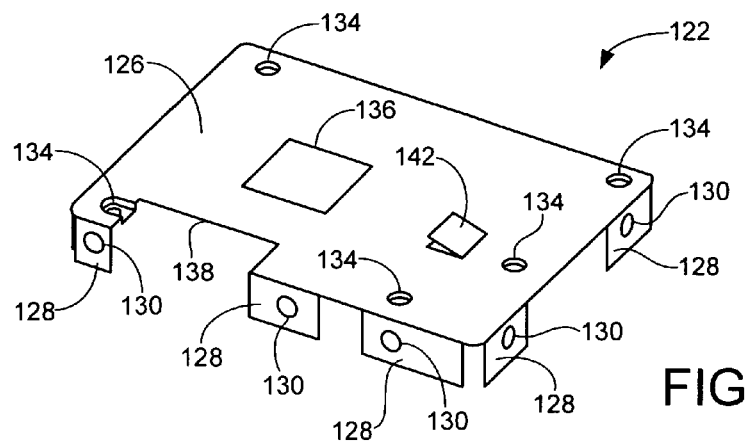
FIG. 2 provides an isometric view of an electromagnetic interference (EMI) shield member onto which a circumferentially extending elastomeric member is subsequently formed to provide the protection assembly.

The protection assembly 102 preferably includes an EMI shield member 122 and an elastomeric shock absorber member 124. As shown in FIG. 2, the shield member 122 preferably comprises a base portion 126 configured to extend adjacent a first surface of the housing 113, in this case the underside of the base deck 114 adjacent the PCB 120. While the shield member 122 is shown to substantially cover the entire areal extent of this surface, such is not necessarily required. Moreover, the shield member can be placed adjacent other surfaces of the housing as desired.

Tab portions 128 preferably extend from respective edges of the base portion 126 so as to extend along at least one second surface of the housing 113 non-parallel to the first surface. In FIG. 2, the tab portions 128 extend adjacent various sidewalls of the base deck 114 that are substantially normal to the underside surface. Preferably, the shield member 122 is electrically and magnetically conductive and formed from stamped sheet metal.

The elastomeric member 124 (FIG. 1) is preferably formed onto the shield member 122 to provide the protection assembly 102 as a single piece, integrated unit as shown in FIG. 1.

Preferably, the elastomeric member 124 material comprises ethylene propylene diene monomer (EPDM), Shore A, hardness 40, although other materials with varied characteristics can be utilized depending on the requirements of a given application.

A suitable injection molding process is preferably utilized whereby the shield member 122 is placed into a mold, and elastomeric material is injected so as to encapsulate the tab portions 128. Apertures 130 in the tab portions (FIG. 2) preferably enhance material flow and interconnection of the elastomeric material with the shield member 122. However, while overmolding is preferred, it will be appreciated that other attachment methodologies can readily be used including the use of adhesives to integrate the shield member 122 with the elastomeric member 124.

Figure 3:
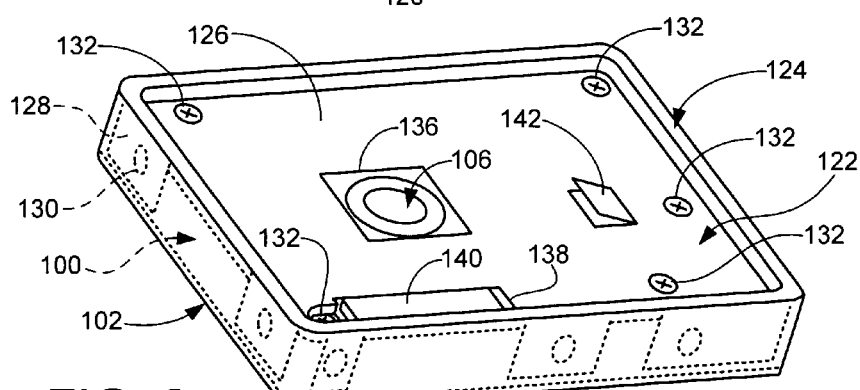
FIG. 3 shows an isometric view of the protection assembly installed onto the data storage device of FIG. 1.

FIG. 3 shows the fully formed protection assembly 102 in conjunction with the assembled data storage device 100. For reference, the orientation in FIG. 3 is opposite that of FIG. 1; that is, that the various components in FIG. 1 have been assembled and flipped over in FIG. 3.

Threaded fasteners 132 (FIG. 3) extend through countersunk apertures 134 (FIG. 2) to attach the protection assembly 102 to the data storage device 100. This attachment preferably maintains the shield member 122 at the same electrical potential as the housing 113 (e.g., ground).

A square central aperture 136 in the base portion 126 (FIG. 2) preferably provides clearance and access to lower portions of the base deck 114 in the vicinity of the spindle motor 106 (FIG. 3). Similarly, an edge recess 138 in the base portion 126 (FIG. 2) preferably provides clearance and access for a PCB connector 140 (FIG. 3). However, it will be appreciated that apertures may be added or omitted as desired in relation to the structure of the enclosure being protected.

FIG. 3 shows the elastomeric member 124 to circumferentially extend about the data storage device 100 along four respective sidewalls of the base deck 114. As further shown in FIG. 4, a z-axis height of the elastomeric member 124 is preferably selected to be greater than a corresponding z-axis height of the data storage device 100, which further enhances shock absorption in the z-direction.

A host interconnect feature 142 (FIGS. 2 and 3) facilitates electrical interconnection (grounding) of the shield member 122 with an associated host device 144 (FIG. 4) in which the data storage device 100 and protection assembly 102 are mounted. The host interconnect feature 142 preferably comprises a bent tang formed from a u-shaped cut in the base portion 126. This allows ready interconnection with a corresponding interconnection mechanism from the host 144, such as a spring tab represented at 146.

Figure 4:
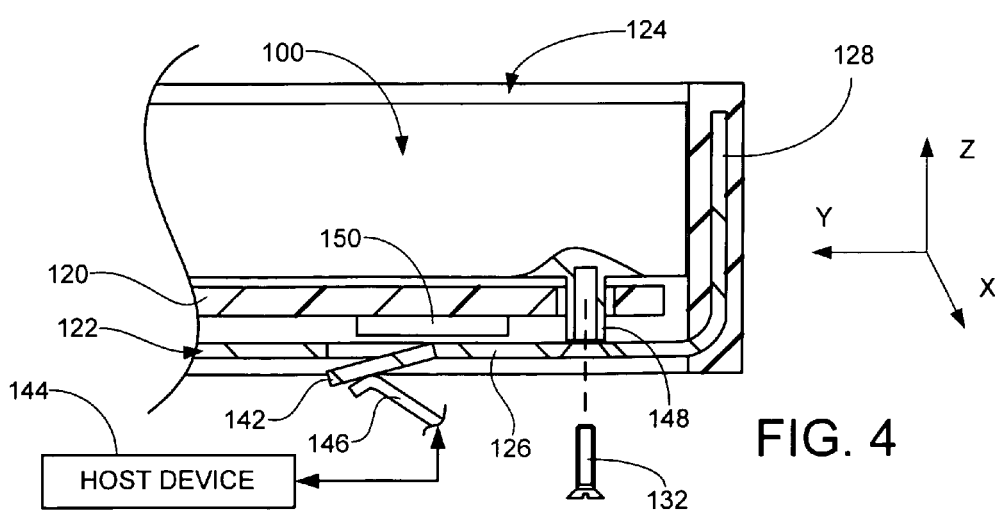
FIG. 4 is an elevational, partial cross-sectional view of the assembly of FIG. 3.

FIG. 4 further shows a preferred use of bosses 148 which extend from the base deck 102 to accommodate the fasteners 132 used to secure the protection assembly 102 to the data storage device 100. The bosses 148 preferably extend through the PCB 120 so that the shield member 122 preferably extends proximate and in non-contacting relation to components 150 supported by the PCB 120. In this way, the PCB 120 is preferably disposed in a gap between the housing 113 and the shield member 122.

The protection assembly 102 thus preferably forms a tub-shaped recess to accommodate the data storage device 100, with the base portion 126 of the shield member 122 forming a base of the recess, and the elastomeric member 124 forming a circumferentially extending sidewall for the recess. The relative angles of the base portion 126 and the tab portions 128 can be set to any desired orientations to accommodate the corresponding shape of the housing 113. Moreover, as desired the tab portions 128 can be configured to exert an inwardly directed spring force so that portions of the elastomeric material between the tab portions 128 and the housing are placed in compression against the housing (see FIG. 4).

Figure 5:
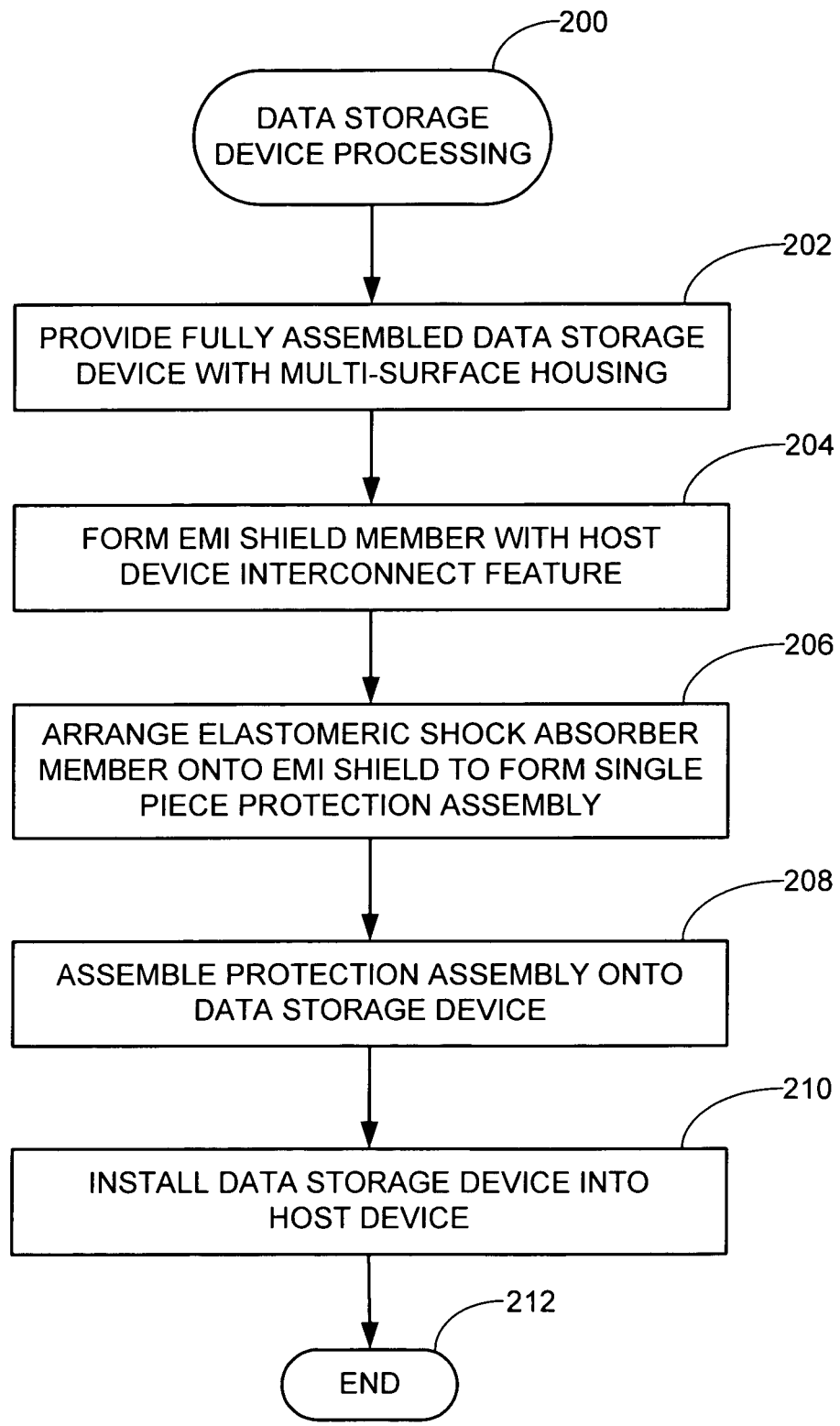
FIG. 5 is a flow chart for a DATA STORAGE DEVICE PROCESSING routine generally illustrative of steps preferably carried out to form the assembly of FIG. 3.

FIG. 5 provides a flow chart for a DATA STORAGE DEVICE PROCESSING routine 200, generally representative of steps carried out in accordance with preferred embodiments of the present invention.

At step 202, a data storage device such as 100 is formed using substantially conventional manufacturing processing. At the conclusion of step 202 the storage device 100 is preferably provisioned with a multi-surface sealed housing such as 113 with associated electronics such as on exterior mounted PCB 120. The storage device 100 is further preferably certified as a fully operational unit at the conclusion of this step.

Step 204 shows the provision of an EMI shield member such as 122 in FIG. 2. Preferably, the shield member has a base portion configured to align along a selected surface of the data storage device housing and has at least one tab portion that extends to extend adjacent a second selected surface of the housing, such as exemplified by base portion 126 and tab portions 128. The shield member is further preferably provisioned with a host device interconnect feature such as tang 142 during this step. In a preferred embodiment, the shield member is formed from stamped sheet metal.

Step 206 shows the arrangement of an elastomeric member such as 124 onto the shield member to provide a single piece integrated protection assembly such as 102. In a preferred embodiment, the elastomeric member is overmolded onto the shield member.

At step 208, the protection assembly is assembled onto the storage device. Preferably, the storage device nests within a tub-shaped recess of the protection assembly as depicted in FIGS. 1 and 3, and secured with a number of threaded fasteners such as 132 in FIGS. 3 and 4.

At step 210, the assembled data storage device and protection assembly are next installed into a host device such as depicted by block 144 in FIG. 4. The host device is preferably characterized as a hand-held portable electronic device, although such is not limiting. During step 210, a reference interconnection is preferably established between the interconnect feature and the host device, as further depicted in FIG. 4. Other operational connections are also preferably established between the data storage device and the host device during this step, such as by way of PCB connector 140 (FIG. 3). The routine then ends at step 212.

It will now be appreciated that preferred embodiments of the present invention as discussed herein provide certain advantages over the prior art. The preferred use of an integrated single piece protection assembly such as exemplified at 102 enhances protection of the nested data storage device 100 along multiple axes from mechanical vibration and shock impacts that may otherwise damage or interfere with the operation of the device 100.

The shield member 122 advantageously provides an EMI shield for the data storage device, facilitating regulatory compliance both from an EMI transmission and from an EMI susceptibility standpoint. Although not required, the shield member 122 has length and width dimensions that are substantially those of the associated surface of the housing so as to substantially cover the associated housing surface.

The preferred use of a bent tab portion in conjunction with a planar base portion enhances structural strength of the protection assembly. The preferred use of a host interconnect feature such as the bent tang 142 allows ready shielding interconnection of the EMI shielding with the host device.

The integrated protection assembly can further be readily manufactured and installed efficiently in an automated environment, and can be easily removed if subsequent access to the data storage device is required.

For purposes of the appended claims, the term "encapsulate" and the like will refer to surrounding engagement between the tab portion (such as 128) with the elastomeric material (such as 124) on at least two surfaces of the tab portion. Thus, encapsulation does not necessarily require overmolding, but rather can be carried out alternatively as discussed above.

The recited "first means" will be understood to correspond to the disclosed single piece, integrated protection assembly 102. The recited "second means" will be understood to correspond to the disclosed tang 142.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
   an electromagnetic interference (EMI) shield member comprising a base portion that extends adjacent a first surface of a multi-surface housing and a tab portion that extends from an edge of said base portion adjacent a second surface of said housing non-parallel to the first surface;
   a printed circuit board (PCB) externally mounted to the first surface in a gap disposed between the first surface and the base portion of the EMI shield member;
   a boss that extends from the housing and through the PCB to the EMI shield member and accommodates a threaded fastener that extends proximate to and in non-contacting relation to a component supported on the PCB; and
   an elastomeric member which extends adjacent the second surface and encapsulates the tab portion.

2. The apparatus of claim 1, wherein the first surface of the housing comprises a substantially rectangular surface with respective length and width dimensions, and wherein the base portion comprises substantially the same said respective length and width dimensions as the first surface.

3. The apparatus of claim 2, wherein the second surface of the housing comprises a sidewall which extends substantially normal to the first surface, and wherein the shield member comprises a bend so that the base portion is substantially parallel to the first surface and the tab portion is substantially parallel to the second surface.

4. The apparatus of claim 1, wherein the base portion further comprises a host device interconnect feature which extends from the base portion to facilitate an electrical interconnection of the shield member with a host device.

5. The apparatus of claim 1, wherein the EMI shield member is characterized as stamped sheet metal.

6. The apparatus of claim 1, wherein the elastomeric member is characterized as injection moldable material.

7. The apparatus of claim 1, wherein the apparatus is formed by a process comprising steps of providing the shield member and molding the elastomeric member onto the shield member using an injection molding process to provide an integrated protection assembly.

8. The apparatus of claim 1, wherein the elastomeric member is formed of elastomeric material.

9. The apparatus of claim 8, wherein the elastomeric material is characterized as ethylene propylene diene monomer (EPDM).

10. The apparatus of claim 1, wherein the housing is characterized as a housing of a data storage device, said housing enclosing at least one data storage medium.

11. The apparatus of claim 1, wherein the shield member and the elastomeric member cooperate to form a single piece integrated protection assembly with a tub-shaped recess, and wherein the tub-shaped recess is configured to receivingly nest the housing.

12. An apparatus comprising:
    a multi-surface housing; and
    a protection assembly configured to nestingly receive the housing, the protection assembly comprising an electromagnetic interference (EMI) shield member comprising a base portion that extends adjacent a first surface of the housing and a tab portion that extends from an edge of said base portion adjacent a second surface of said housing non-parallel to the first surface, wherein a printed circuit board (PCB) is externally mounted to the first surface in a gap disposed between the first surface and the base portion of the EMI shield member, and a boss extends from the first surface through the PCB to the EMI shield member and accommodates a threaded fastener that extends proximate to and in non-contacting relation to a component supported on the PCB, the protection assembly further comprising an elastomeric member which extends adjacent the second surface and encapsulates the tab portion.

13. The apparatus of claim 12, wherein the first surface supports an externally mounted printed circuit board (PCB) and wherein the PCB is disposed in a gap between the first surface and the base portion of the shield member.

14. The apparatus of claim 13, wherein the second surface of the housing comprises a sidewall which extends substantially normal to the first surface, and wherein the shield member comprises a bend so that the base portion is substantially parallel to the first surface and the tab portion is substantially parallel to the second surface.

15. The apparatus of claim 12, wherein the base portion further comprises a host device interconnect feature which extends from the base portion to facilitate an electrical interconnection of the shield member with a host device.

16. The apparatus of claim 15, wherein the host device interconnect feature is characterized as a bent tang formed from a substantially u-shaped cut in the base portion that establishes an electrical ground connection between the shield member and the host device.

17. The apparatus of claim 12, wherein the EMI shield member is characterized as stamped sheet metal.

18. The apparatus of claim 12 wherein the apparatus is formed by a process comprising steps of providing the shield member and molding the elastomeric member onto the shield member using an injection molding process to provide an integrated protection assembly with a tub-shaped recess which receivingly nests the housing.

* * * * *